(12) United States Patent
White

(10) Patent No.: US 7,305,837 B2
(45) Date of Patent: Dec. 11, 2007

(54) CRYOGENIC PIPING SYSTEM

(75) Inventor: Norman Henry White, Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 537 days.

(21) Appl. No.: 10/941,807

(22) Filed: Sep. 16, 2004

(65) Prior Publication Data

US 2006/0054234 A1     Mar. 16, 2006

(51) Int. Cl.
*F17C 13/00* (2006.01)
*F16L 9/14* (2006.01)
(52) U.S. Cl. .................................. 62/50.7; 138/148
(58) Field of Classification Search ............ 62/50.7; 138/149, 114, 148
See application file for complete search history.

(56) References Cited

U.S. PATENT DOCUMENTS

| 4,515,397 | A |   | 5/1985  | Nowobilski et al. ....... 285/47 |
| 4,606,196 | A |   | 8/1986  | Acharya et al. ............ 62/45 |
| 4,924,679 | A | * | 5/1990  | Brigham et al. ........... 62/50.7 |
| 5,160,769 | A | * | 11/1992 | Garrett ..................... 428/36.5 |
| 6,070,413 | A | * | 6/2000  | Ward ........................ 62/50.07 |
| 6,216,745 | B1|   | 4/2001  | Augustynowicz et al. .. 138/149 |
| 6,257,282 | B1| * | 7/2001  | Emmer et al. ............. 138/149 |
| 6,521,077 | B1|   | 2/2003  | McGivern et al. ......... 156/304.1 |
| 6,730,851 | B2| * | 5/2004  | Ladie' et al. ............. 174/125.1 |

\* cited by examiner

*Primary Examiner*—William C Doerrler
(74) *Attorney, Agent, or Firm*—David M. Rosenblum

(57) ABSTRACT

A method for improving the insulation characteristics of a cryogenic piping system wherein an insulation volume defined by a jacket coaxial to an inner pipe is evacuated to a moderate vacuum and then filled with a condensable gas in one or more evacuation and filling cycles, and then, after evacuation to a moderate vacuum, the condensable gas is condensed to effect a high vacuum within the insulation volume.

7 Claims, 1 Drawing Sheet

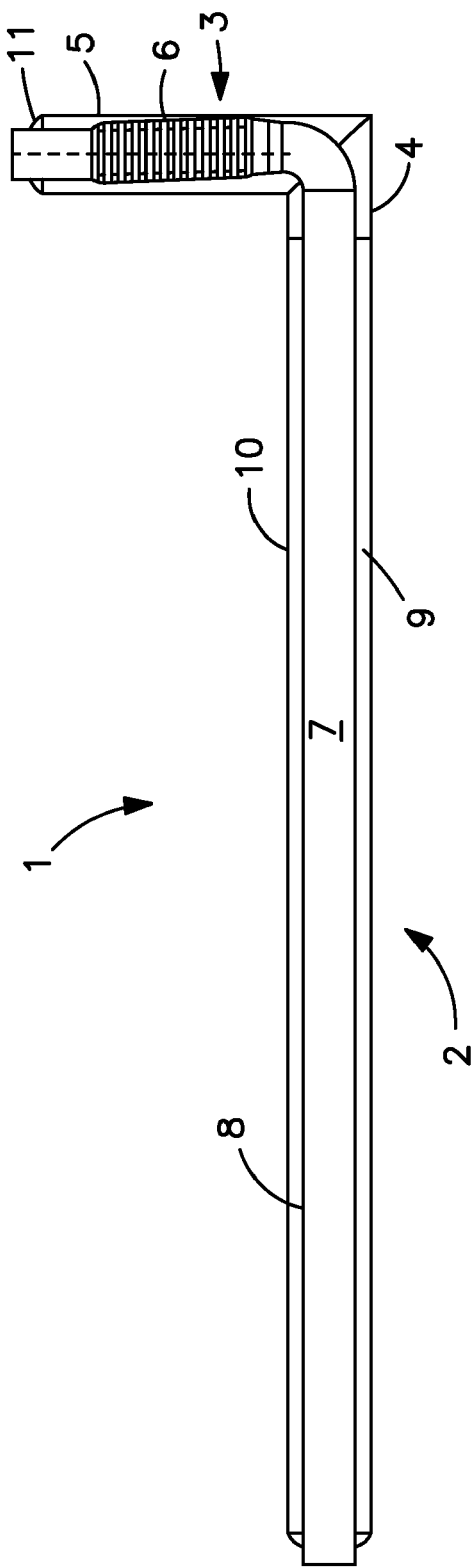

CRYOGENIC PIPING SYSTEM

TECHNICAL FIELD

This invention relates generally to piping for the flow of fluids and, more particularly, to piping for the flow of fluids at temperatures below ambient temperature.

BACKGROUND ART

It is very important in the operation of a cryogenic pipeline which serves to transport a cryogenic fluid that heat inflow to the cryogenic fluid from the ambient air be minimized. Currently there are two general approaches to insulating cryogenic pipelines. In general, acceptable thermal performance is achieved when the outside surface temperature of the insulation is higher than the dew point under normal weather conditions, so that water and ice do not accumulate on its surface.

High temperature insulations such as those used on steam pipes are often applied in cryogenic service. This is a low cost method with relatively short life in cryogenic service. Such insulation degrades quickly in cryogenic service due to two mechanisms. The cryogenic temperatures result in a low partial pressure of water in the insulation. Water from the atmosphere diffuses into the insulation particularly along seams, joints and crevices. The water freezes at these sites, accumulates and thereby mechanically breaks the insulation down particularly in freeze-thaw cycles. In addition, the pipe contracts approximately 3 inches per 100 feet as the temperature is reduced from ambient to cryogenic temperature. This contraction also works to break up the insulation mechanically.

Acceptable thermal performance generally requires more than three inches of this insulation. The standard jacket for 1-inch nominal pipe is 8 inch OD jacket. This is space consuming.

Various attempts to minimize water penetration of seams and joints, and methods to accommodate thermal contraction of the pipe are offered commercially. Closed cell polyurethane, pre-foamed within in a PVC jacket is available. The PVC jacket and closed cell form of the polyurethane help to prevent water penetration from the radial surface. However, there is no cost effective way to seal the end joints and there is no offering for taking up the thermal contraction. Ice balls are common at joints and the useful life is perhaps 5 years. Preformed polyurethane insulation is available in lengths each of which has fiberglass end caps that are sealed with mastic and are intended to protect the ends from water penetration and to accommodate the thermal shrinkage of the pipe within the section. The elaborate end caps cannot be formed in the field meaning that on-site changes are difficult. The insulation joints are field formed in two steps each requiring an estimated 4 hours labor. Available designs of jog joints to accommodate the cumulative contraction of multiple sections break down typically within months of normal service, resulting in ice balls at these locations. The useful life is perhaps 15 years.

Vacuum-jacketed piping was designed to deliver high performance insulation with indefinite useful life. This approach uses multi-layer radiation shields in a vacuum commonly referred to as super insulation. Typically, the piping is made in lengths that are pre-evacuated in the factory. Each end terminates in a bayonet, which is used to assemble the piping system in the field. In operation the jacket remains at near ambient temperature while the inner pipe operates at cryogenic temperature when it contains product. Bellows are placed either in the jacket or the pipe or both to allow the contraction in the pipe to proceed. The bellows are often placed in the jacket because in this case the bellows are exposed to vacuum pressure rather than process pressure. The chief disadvantage of this placement is that at operating temperature, the length of the jacket is reduced and the pipe support system must be designed to accommodate the movement. Although the bellows are exposed to environmental and mechanical damage, in the event of failure the consequence is limited to loss of vacuum.

As an alternative, the bellows may be placed in the inner pipe. In this case the length of the jacket is not reduced at operating temperature. However the bellows are subject to operating pressure and as such must be heavier and impose increased loading on the thin metal welds that join them to the inner pipe. Significant piping system failures have been experienced with this configuration where the lading is oxygen.

The vacuums required in these systems result in long pump out times. Several steps are taken to facilitate the evacuation process. A vacuum pump is normally connected for several days. The evacuation connection must have a large size opening to allow passage of the molecules out of the insulation space. This is because the difference in pressure at the vacuum pump inlet and the insulation space approaches zero. The practical length of the prefabricated sections is limited due to the length that can efficiently be transported and handled. In addition, pump out times are proportional to the length. The vacuum space is normally heated during the evacuation process to drive out gases impregnated in the insulation and absorbed on metal surfaces and to increase the diffusion rate of molecules in the insulation space toward the evacuation connection.

Elaborate steps are taken to preserve the vacuum once it is achieved. The evacuation connection is often designed to serve as the pressure relief device to protect the jacket in the event it is pressurized due to failure of the inner line. This reduces the number of connections and therefore the number of potential leaks. Palladium oxide is often employed to chemically bind any hydrogen that off gases from the metal over the long term. The reaction produces pure palladium, which in turn further chemisorbs further hydrogen. The resulting palladium with chemisorbed hydrogen is highly reactive to oxygen and has been involved in several explosions where oxygen is the transferred commodity. In these cases the inner pipe has failed releasing oxygen into the insulation space which subsequently reacted with the palladium. This highly exothermic reaction subsequently ignites aluminum foil used in the multi-wrap insulation, which burns violently in the presence of oxygen. In spite of this careful packaging the heat of reaction of palladium and oxygen can be increased substantially in the event of concurrent impact. Such impact may occur during the turbulent pressurization of the outer jacket that may occur in the event of failure of the inner pipe. The off gassing of hydrogen is a long-term process. Experience has shown that vacuum often degrades due to leakage, particularly at the evacuation connection long before hydrogen off gassing is a factor.

Accordingly, it is an object of this invention to provide a cryogenic piping system which has improved insulation characteristics over those of conventional piping systems.

SUMMARY OF THE INVENTION

The above and other objects, which will become apparent to those skilled in the art upon a reading of this disclosure, are attained by the present invention which is:

A method for improving the insulation characteristics of a cryogenic piping system having a pipe volume and an insulation volume adjacent to the pipe volume comprising evacuating the insulation volume to achieve a moderate vacuum, filling the insulation volume with a high purity condensable gas, evacuating the insulation volume to a moderate vacuum, and condensing the condensable gas to effect a high vacuum within the insulation volume.

As used herein the term "high vacuum" means less than one micron Hg.

As used herein the term "moderate vacuum" means more than one micron Hg.

As used herein the term "condensable gas" means a gas which is condensable at lading temperatures.

As used herein the term "lading temperatures" means less than −200° F.

As used herein the term "high purity condensable gas" means a gas having a purity of at least 99.8 percent.

BRIEF DESCRIPTION OF THE DRAWING

The sole FIGURE is a representation partially in cross section of one embodiment of a cryogenic piping system which may be employed in the practice of this invention.

DETAILED DESCRIPTION

The invention will be described in detail with reference to the Drawing. Referring now to the FIGURE there is shown a cryogenic piping system 1 having a straight section 2 and an elbow assembly 3. The elbow assembly 3 has a free leg 4 and a fixed leg 5 between which is positioned flexible hose 6. The cryogenic piping system has a pipe volume 7 defined by inner pipe 8, and an insulation volume 9 defined by outer jacket 10 and the outside surface of inner pipe 8. The insulation volume 9 is adjacent to the pipe volume 7. Preferably outer jacket 10 extends along the entire length of straight section 2 and of elbow assembly 3.

In the practice of this invention, the insulation volume is evacuated, such as by use of a vacuum pump, to a moderate vacuum, typically on the order of about 100 microns Hg. Thereafter the resulting evacuated insulation volume is filled with high purity condensable gas. The preferred high purity condensable gas for use in the practice of this invention is carbon dioxide having a carbon dioxide concentration of at least 99.9 mole percent. Other high purity condensable gases which may be used in the practice of this invention include nitrous oxide, sulfur dioxide, chlorine, and the like.

If desired the steps of evacuating the insulation volume and then filling the insulation volume with condensable gas may be repeated one or more times. In the particular preferred practice of this invention the steps of evacuating the insulation volume and then filling the insulation volume with condensable gas are carried out three times, i.e. carried out once and then repeated twice more.

Thereafter the insulation volume is evacuated to a moderate vacuum and then the high purity condensable gas is cooled and condensed, preferably by flowing cryogenic liquid through the pipe volume. The flow of the cryogenic liquid through the pipe volume serves to provide continuous cooling to the now liquefied or solidified condensable gas, thus keeping it in the liquid and/or solid state. The liquefaction or solidification of the condensable gas forms a high vacuum within the insulation volume. This high vacuum serves to improve the insulation characteristics of the cryogenic piping system in a facile and cost effective manner.

The invention may be employed for the flow of many cryogenic fluids among which one can name nitrogen, oxygen, argon, hydrogen, helium, methane, ethane, and the like.

Desirable features of the cryogenic piping system of this invention in its preferred embodiment comprise i) an insulation jacket which is a continuous conduit having no mechanical joints which forms a single insulation space or volume about the inner pipe along the length of the inner pipe. In service the jacket does not change length.

ii) an inner pipe which is a continuous conduit having no mechanical joints which is contained within the insulation jacket.

iii) radial seals at each end of the piping system to complete the definition of the insulation space. These radial seals also serve as fixed ends or fixed points 11 for the inner pipe relative to the jacket.

iv) elbow assemblies which are designed to accommodate the contraction of the inner pipe at operating temperature relative to the jacket.

a) each piping system has at least one elbow assembly.

b) each elbow assembly has a fixed leg and a free leg. The fixed leg is so called because it has an axial support member that fixes the axial position of the inner pipe relative to the outer jacket. A flexible hose designed to deform in bending is located in the inner pipe of the fixed leg between the axial support member and the crotch of the elbow. The inner pipe is free to move axially within the jacket in the free leg of the elbow.

c) the flexible hose in the fixed section accommodates contraction of the inner pipe connected to the free end. When the inner pipe is at ambient temperature the hose is positioned near the jacket wall so as to achieve the greatest possible gap between the inner crotch of the jacket elbow and the outer crotch of the inner pipe elbow. At operating temperature the pipe connected to the free leg of the elbow contracts and this gap is reduced to the minimum possible.

Although the invention has been described in detail with reference to a certain preferred embodiment, those skilled in the art will recognize that there are other embodiments of the invention within the spirit and the scope of the claims.

The invention claimed is:

1. A method for improving the insulation characteristics of a cryogenic piping system having a pipe volume and an insulation volume adjacent to the pipe volume comprising evacuating the insulation volume to achieve a moderate vacuum, filling the insulation volume with a high purity condensable gas, evacuating the insulation volume to a moderate vacuum, and condensing the condensable gas to effect a high vacuum within the insulation volume.

2. The method of claim 1 wherein the pipe volume comprises a straight section and an elbow section.

3. The method of claim 2 wherein the elbow section is defined by flexible hose between a free leg and a fixed leg.

4. The method of claim 2 wherein the insulation volume extends around the pipe volume for the entire length of the straight section and the elbow section.

5. The method of claim 1 wherein the steps of evacuating the insulation volume to achieve a moderate vacuum followed by filling the insulation volume with a high purity condensable gas are repeated at least once prior to the final evacuation to a moderate vacuum and the condensing of the condensable gas to effect a high vacuum.

6. The method of claim 1 wherein the condensable gas is carbon dioxide having a carbon dioxide concentration of at least 99.9 mole percent.

7. The method of claim 1 wherein the condensable gas is condensed by the provision of refrigeration from cryogenic liquid flowing within the pipe volume.

* * * * *